Aug. 11, 1953    F. STITT ET AL    2,648,598
PROCESS FOR DETERMINATION OF ETHYLENE IN GASES
Filed June 27, 1950

INVENTORS
F. STITT
A. H. TJENSVOLD
Y. TOMIMATSU

BY

*L. M. Mantell*
ATTORNEY

Patented Aug. 11, 1953

2,648,598

UNITED STATES PATENT OFFICE 2,648,598

PROCESS FOR DETERMINATION OF ETHYLENE IN GASES

Fred Stitt and Yoshio Tomimatsu, Berkeley, and Arnt H. Tjensvold, San Francisco, Calif., assignors to the United States of America as represented by the Secretary of Agriculture Application June 27, 1950, Serial No. 170,672

3 Claims. (Cl. 23—232)

(Granted under Title 35, U. S. Code (1952), sec. 266)

This invention relates to an improvement in a process and apparatus for analysis of gases to determine ethylene content thereof.

Ethylene is widely used in the food industry to accelerate the ripening or coloring of vegetables and fruits, for example tomatoes, bananas, pineapples, and citrus fruits. Control of the ethylene concentration is necessary to prevent over-treatment which causes softening, stem-end rot and other undesirable changes. Ethylene is also used in the storage of cereal grains to prevent harmful increases in temperature (Balls and Hale, U. S. Patent 2,381,421). In the storage of apples and pears, ethylene is spontaneously produced as a result of the continuing metabolism within the fruit. This ethylene is detrimental to these fruits, as it causes scalding. Thus in the storage of such fruits it is necessary to know the concentration of ethylene in the air of the storage compartment to make sure that the ventilation used is properly removing this gas.

Previous to this invention no rapid, reliable method was available for determining ethylene at low concentrations. Conventional gas analysis procedures involving absorption of ethylene in bromine water or combustion with oxygen are of no value when dealing with low concentrations of ethylene because the markings on the gas burets cannot be read with the requisite accuracy. Analytical procedures involving oxidation of the ethylene with cupric oxide and measurement of the carbon dioxide formed are accurate but are time-consuming and require delicate laboratory instruments. Colorimetric methods have been employed for measuring low concentrations of ethylene but are not reliable since the reagents used tend to fade during comparison with standards.

We have invented a novel apparatus and process for determining ethylene concentrations. The technique involves contacting a known volume of the ethylene-containing gas with heated red mercuric oxide whereby the ethylene is oxidized to carbon dioxide and water, releasing mercury in vapor form. The following equation illustrates the principal reaction involved:

$$C_2H_4 + HgO \rightarrow 2CO_2 + 2H_2O + 6Hg$$

The gas ensuing from this reaction is then contacted with a sensitized strip, as disclosed in Patent No. 2,567,251, that is, a strip which is  blackened by contact with the mercury vapor. The degree, or length, of blackening of the strip is used as a measure of mercury concentration. Since the amount of mercury released is proportional to the amount of ethylene introduced originally the extent of blackening is a measure of ethylene concentration.

The process of this invention is outstanding in its sensitivity. Very low concentrations of ethylene can be accurately measured. For example with a sample of gas as small as 40 ml. one can measure accurately ethylene concentrations in a range as low as 5 or 10 p. p. m. The determination is rapid, requiring but a few minutes. The operator need not be a skilled chemist nor does he require an analytical balance or other delicate apparatus. All that is necessary is to pass a measured sample of gas through the apparatus and then by comparison of the reacted strip with standard strips or by use of a graph, the concentration of ethylene is obtained directly.

Although our invention is primarily adapted to the determination of ethylene in admixture with air, it is equally useful to determine the ethylene content of gaseous mixtures containing ethylene plus any non-combustible gas (or gases) as for example, nitrogen, carbon dioxide, oxygen helium, sulphur dioxide, and so forth.

One embodiment of the invention is shown in the drawing, in which.

Figure 1:
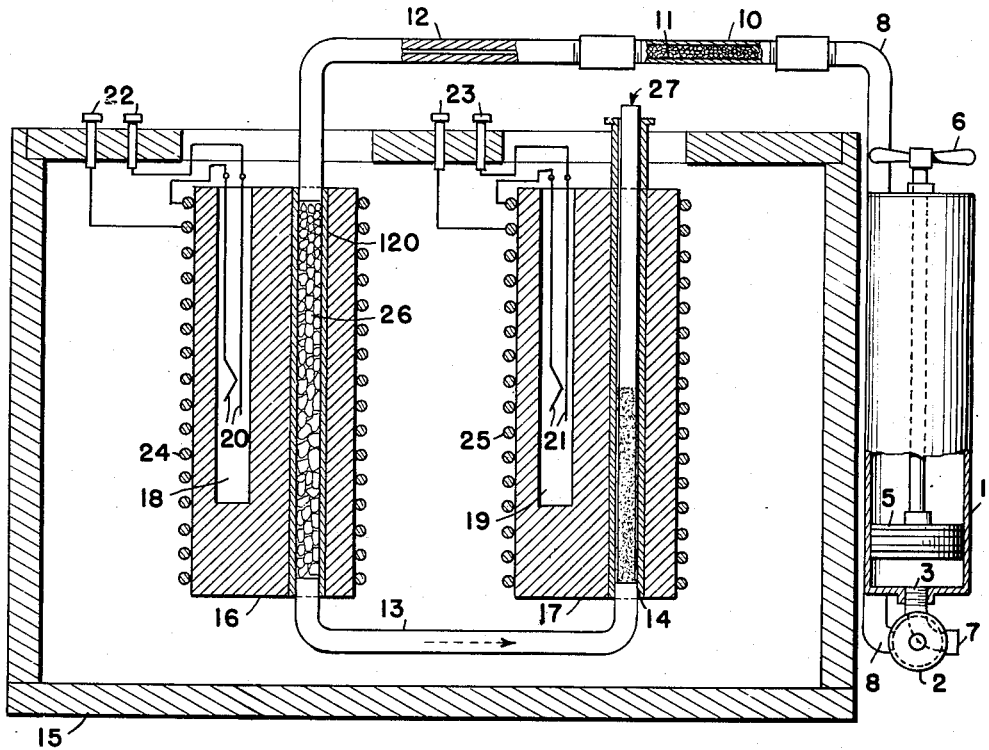
Fig. 1 is a longitudinal section of the device of this invention.

In the accompanying drawing is shown a preferred form of apparatus in accordance with this invention. The apparatus includes a pipet I which measures a specific volume of gas to be analyzed. In order to obtain a sample of gas and introduce it into the apparatus, the following steps are carried out: Valve 2, a three-way stopcock, is rotated so that tube 3 is connected to nipple 7 which, in turn, is connected to the source of the gas to be analyzed and piston 5 is raised by lifting handle 6. This draws the gas into the pipet I which has a known volume. While maintaining piston 5 in its uppermost position, valve 2 is rotated to interconnect tubes 3 and 8. The piston is then released whereupon the weight of the piston causes the gas to be forced through tube 8 into the analytical device. The gas passes through tube 8 into chamber 10 containing absorptive material 11. This material serves to remove undesired materials from the gas sample. For example, pumice saturated with concentrated sulphuric acid will not absorb ethylene but will absorb other gases which interfere with the reaction, such as aldehydes, ketones, alcohols, esters, acids, ethers, and other oxygen-containing organic compounds. It also removes the more reactive unsaturated compounds such as acetylene, propylene, butylene, and other olefines. If the gas sample does not contain gases which will interfere with the ethylene determination, chamber 10 and absorptive material 11 may be omitted. It has generally been observed that for measuring ethylene concentration in food coloring and ripening rooms, the absorptive device can be omitted since the concentration of interfering gases is negligible. The gas which has been purified in its passage through chamber 10 then passes through tube 12, reactor 120, tubes 13 and 14, and leaving the last is discharged into the atmosphere. Tubes 3, 8, 12 and 13 are preferably capillary tubes to diminish the amount of sample which will be retained in the system. The analysis portion of the device includes block 15 which is made of glass fibers, asbestos, or other structural insulating material. Block 15 is provided with cylinders 16 and 17 which are made of brass, copper, or other metal which is a good conductor of heat. The cylinders are provided with wells 18 and 19 in which are situated thermo-switches 20 and 21. These thermo-switches are used to control the flow of electrical energy supplied through terminals 22 and 23 to heating coils 24 and 25. By these means, the temperature of cylinders 16 and 17 may be independently controlled at any desired level. For proper operation of the device, temperature control is significant. With regard to cylinder 16, two factors are involved. The first is to have a temperature high enough to get complete oxidation of ethylene within a reasonable time of contact; such results can be obtained with a minimum temperature of 275° C. The second factor is that too high temperature will cause thermal decomposition of the mercuric oxide whereby the sensitive strip will be blackening by this undesired reaction. Thus the maximum temperature to be used is 325° C. Taking into account both factors, cylinder 16 should be maintained in the range from 275° to 325° C., preferably 285° C. to 300° C. The latter range is preferred, since in this range the time of contact may be varied widely between 2 to 25 seconds, and still complete oxidation will occur. With regard to cylinder 17, the temperature must be high enough to keep the mercury vapor in the vapor phase and yet not high enough to cause darkening of the paper by the heat alone. Taking into account both factors, a temperature range from about 120° C. to about 200° C. gives good results.

Reactor 120 is positioned in a bore through cylinder 16. This reactor contains red mercuric oxide, preferably in granular form. For example, 8 to 14 mesh granules are suitable. If desired, the red mercuric oxide can be deposited on granular pumice or other suitable inert carrier to provide good contact between the gaseous and solid reactants. The yellow form of mercuric oxide may be initially used in reactor 120. In such case when the reactor is heated to the operating temperature the yellow form of the oxide will be converted into the red form of the oxide.

The gas passing through the reactor 120 contacts heated red mercuric oxide 26 whereby the ethylene present in the gas is quantitatively oxidized, producing mercury vapor as noted above.

Figure 2:
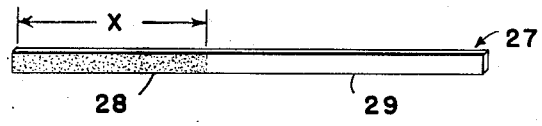
Fig. 2 is the sensitive strip after reaction.

The resulting gas, containing mercury vapor proportional to the concentration of ethylene originally present, passes through tube 13 into tube 14. A sensitive strip 27 is positioned within tube 14. The mercury vapor in the gas contacts the sensitive strip 27, causing it to be blackened to an extent determined by the concentration of mercury. After the gas sample has been passed through the apparatus, strip 27 is withdrawn and the length of the blackened portion measured. The length of blackening is then compared with the length of blackening obtained with standardized gas samples and the concentration of ethylene is thus obtained. Fig. 2 shows the appearance of the sensitive strip after withdrawal thereof from the instrument, the left end of the strip in the drawing being the end which is nearest the bottom of tube 14. The black portion is represented by area 28 and the unreacted (light-colored) portion represented by area 29. The length of the blackened portion X is measured by a rule, or by well known automatic devices.

A convenient method of obtaining the ethylene concentration from the length of the blackened area can be accomplished by exposing strips to standardized gas samples and then plotting on graph paper the concentration of ethylene versus length of blackening. Then when an unknown is run, the length of blackening can be applied to the graph and the corresponding concentration can be read off the graph directly.

The following examples disclose particular techniques within the scope of this invention, but it is to be understood that these examples are given only by way of illustration and not limitation.

*Example I*

An apparatus was set up as illustrated in the drawing and as heretofore described. In these runs, the mercuric oxide 26 was maintained at a temperature of 285° C. and the selenium strip 27 maintained at 125° C. Reactor 120 had an inside diameter of 3 mm. and was 3½ inches long; it was filled with granules of red mercuric oxide. The volume of pipet 1 was 40 ml. The gas flowed through the instrument at the rate of 15 ml./min., thus giving a contact time of approximately 2 seconds.

The selenium strip used was prepared as follows:

Sheets of 8" x 8" chemical filter paper were immersed in aqueous 0.09 M potassium selenocyanate solution for about 2 minutes. The papers were then removed from the solution and hung in a closed container and allowed to drain for about 15 minutes. The drained papers were then hung in a large jar which contained a pool of concentrated hydrochloric acid at the bottom of the jar. Anhydrous hydrogen chloride was introduced into the jar through a tube terminating in the pool of acid. The papers were subjected to the acidic atmosphere thus created for 15 to 30 seconds then removed and hung in the air until dry. One inch margins on all four sides of the dry papers were then cut off and discarded. The remaining 6" x 6" sheets were cut into strips ⅛" wide.

Several runs were then made using gas samples containing varying proportions of ethylene. In each case the sample was prepared in a definite concentration by mixing measured amounts of ethylene with measured amounts of air by the use of gas pipets and burets. After each run, the reacted strip was removed and the blackened area measured. The following results were obtained:

| Concentration of ethylene, p. p. m. | Length of blackening, mm. |
|---|---|
| 10 | 3 |
| 25 | 7.2 |
| 50 | 14.4 |
| 75 | 21.5 |
| 100 | 28.7 |
| 150 | 43 |
| 200 | 57.3 |

These figures demonstrate the fact that ethylene concentration is directly proportional to length of the blackened area.

These calibration data are then used for a determination of an unknown gas sample. Thus if a strip of this paper is treated with an unknown gas sample under the same conditions as used in the calibration, the length of blackening is a measure of mercury concentration. For example, if the length of blackening obtained is 35 mm. then the mercury concentration is 122 p. p. m. For convenience, one may plot on graph paper the concentration of mercury versus length of blackening and thus read directly on the graph the concentration of mercury corresponding to the length of blackening obtained.

*Example II*

Several runs were made in the apparatus as herein described and with the particular conditions and dimensions set forth in Example I. However in this case a different selenium strip was used. This selenium strip was prepared as described in Example I but the concentration of potassium selenocyanate was 0.01 molar. A series of experiments were conducted utilizing standardized samples of ethylene-air mixtures measuring the length of blackening obtained with each. The following results were obtained:

TABLE II

| Concentration of ethylene, p. p. m. | Length of blackening, mm. |
|---|---|
| 2.6 | 6.2 |
| 7.5 | 16 |
| 12.5 | 29 |
| 17.2 | 41 |
| 21.0 | 51 |
| 25.0 | 60 |

In applying the principles of this invention, one can use different types of sensitive selenium sulphide strips which can be prepared by painting paper with a colloidal dispersion of selenium sulphide or by coating the paper with dry, powdered selenium sulphide. However, we prefer to use a selenium strip. This selenium strip is prepared as follows:

(1) A backing material is first selected. We prefer to use a purified chemical filter paper, but one may also use other forms of uncoated paper, cloth, asbestos fiber, or other porous sheet material. The backing material is then soaked in a solution containing selenocyanate ions, then drained to remove excess liquid. We prefer to use for the impregnation an aqueous solution of potassium selenocyanate, although any water-soluble selenocyanate is suitable, for example, sodium selenocyanate, ammonium selenocyanate, etc. The point is, of course, that the solution contain selenocyanate ions, the particular cation being unimportant as long as the salt is soluble enough to give the desired concentration. The concentration used depends on the sensitivity desired for the finished strip. The lower the concentration of selenium, the higher will be the sensitivity. Generally, the concentration of selenocyanate solution is correlated with the approximate range of ethylene concentration to be measured. For very low ethylene concentrations the selenocyanate concentration may be as low as 0.005 molar, while for high concentrations of ethylene the selenocyanate concentration may be as high as 1 molar. By proper correlation of selenocyanate concentration and expected ethylene concentration, the length of blackening will then be of convenient length, for example 6 to 100 mm. along a six inch strip.

(2) The strip is then suspended, while wet, in an atmosphere containing acid vapors. For example the strip may be placed in a bell jar containing a beaker of hydrochloric acid. The particular acid is not important as long as it is volatile. Thus the vapors of nitric acid, hydrobromic, acetic, or other volatile acids may be used. The result of this treatment is that the selenocyanate is decomposed into elemental selenium. The following equation illustrates the reaction, assuming that potassium selenocyanate and hydrochloric acid are the reagents employed.

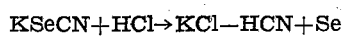

$$KSeCN + HCl \rightarrow KCl - HCN + Se$$

The potassium chloride remains in the strip along with the elemental selenium and does not affect the use or activity of the strip. This reaction occurs very rapidly and it is preferred to expose the strip to the acid atmosphere for only a short period, about 5 seconds to 30 minutes. It has been observed that the treatment for substantially longer periods tends to decrease the reactivity of the strip. In this treatment it is also necessary to apply the acid treatment while the strip is wet. If the strip is allowed to dry, the elemental selenium will still be formed, but in an unreactive form.

The acid treated strip is then dried. This drying is preferably carried out by simply exposing the strip to the atmosphere. If desired one may subject the strip to a current of air which may be heated to not greater than about 100° C. to hasten the evaporation of water and hydrogen cyanide.

The selenium strip prepared as above described has a salmon color. The blackening caused by formation of mercury selenide contrasts strongly with the original color of the strip and is thus easily measured. Further, we prefer this strip because it contains the selenium uniformly impregnated in the strip, the selenium is in an active form, and the strip is stable and is relatively temperature insensitive. Thus, the temperature of the strip can be varied from about 120° C. to about 200° C. and the length of blackening will remain constant, with a constant amount of ethylene. When exposed to mercury vapor, in accordance with this process, the length of blackening is substantially directly proportional to the concentration of mercury, hence to the concentration of ethylene.

The invention herein described may be manufactured and used by or for the Government of the United States of America for governmental

Having thus described our invention, we claim:

1. The process of determining the concentration of ethylene in a gas which comprises passing the gas at a temperature from about 285° C. to about 300° C. over red mercuric oxide for a contact time of 2 to 25 seconds whereby a reaction occurs and mercury is released into the gas in proportion to the concentration of ethylene, passing the gaseous products of the reaction longitudinally along the surface of an elongated strip coated with elemental red selenium maintained at a temperature from about 120° C. to about 200° C. and ascertaining the concentration of ethylene by the length of blackening along the selenium strip.

2. The process of determining ethylene in air comprising: removing oxygen-containing organic compounds from a predetermined volume of air containing ethylene, passing said air containing ethylene at a temperature from about 285° C. to about 300° C. over granular red mercuric oxide for a contact time of 2 to 25 seconds whereby the ethylene is quantitatively oxidized to carbon dioxide and mercury vapor released into the air; passing the gaseous products of reaction over an elongated strip coated with elemental red selenium at about 120° to 200° C. prepared by impregnating a backing material with an aqueous solution containing selenocyanate ions and contacting the wet strips with an atmosphere of acid vapors to precipitate elemental selenium and drying, thereby precipitating elemental red selenium on the backing in reactive, relatively temperature insensitive form within the said range 120° to 200° C.; and thereafter measuring the length of color change of the strip.

3. The process of determining the concentration of ethylene in a gas which comprises passing the gas at a temperature from about 285° C. to about 300° C. over red mercuric oxide for a contact time of 2 to 25 seconds whereby a reaction occurs and mercury vapor is released into the gas in proportion to the concentration of ethylene, passing the gaseous products of the reaction longitudinally over a strip coated with free selenium maintained at a temperature from about 120° C. to about 200° C. and measuring the length of blackening along the strip, said strip comprising sheet material uniformly impregnated with elemental red selenium and which exhibits substantially equal sensitivity to mercury vapor in the range from about 120° C. to about 200° C.

FRED STITT.
YOSHIO TOMIMATSU.
ARNT H. TJENSVOLD.

References Cited in the file of this patent

UNITED STATES PATENTS

| Number | Name | Date |
|---|---|---|
| 1,512,893 | Fulweiler | Oct. 21, 1924 |
| 1,711,742 | Nordlander | May 7, 1929 |
| 1,891,429 | Ljunggren | Dec. 20, 1932 |
| 1,977,002 | Ljunggren | Oct. 16, 1934 |
| 2,232,622 | Moses | Feb. 18, 1941 |
| 2,345,090 | Brace | Mar. 28, 1944 |
| 2,567,251 | Stitt | Sept. 11, 1951 |

OTHER REFERENCES

Beckman et al., PB Report 5921, Office of the Publications Board, Dept. of Commerce (1945).

McCullough et al., "Determination of CO in Air by Use of Red Mercuric Oxide." Ind. and Eng. Chem., Anal. Ed., vol. 19, No. 12, pages 999–1002, December 1947.

Beckman et al., "Microdetermination of Carbon Monoxide in Air." Ind. and Eng. Chem., Anal. Ed., vol. 20, No. 7, pages 674–677, July 1948.